United States Patent
Klippstein et al.

(10) Patent No.: US 7,321,343 B2
(45) Date of Patent: Jan. 22, 2008

(54) METHOD FOR AUTO-STEREOSCOPIC IMAGE DISPLAY WITH A WAVELENGTH FILTER ARRAY

(75) Inventors: Markus Klippstein, Jena-Muenchenroda (DE); Ingo Relke, Jena (DE)

(73) Assignee: X3D Technologies GmbH, Jena (DE)

( * ) Notice: Subject to any disclaimer, the term of this patent is extended or adjusted under 35 U.S.C. 154(b) by 600 days.

(21) Appl. No.: 10/482,440

(22) PCT Filed: Sep. 5, 2002

(86) PCT No.: PCT/EP02/09927

§ 371 (c)(1),
(2), (4) Date: Jul. 16, 2004

(87) PCT Pub. No.: WO03/024122

PCT Pub. Date: Mar. 20, 2003

(65) Prior Publication Data

US 2004/0245440 A1   Dec. 9, 2004

(30) Foreign Application Priority Data

Sep. 6, 2001  (DE) ............................... 101 45 133

(51) Int. Cl.
*G09G 5/00* (2006.01)
(52) U.S. Cl. ........................... 345/8; 345/3.1; 345/207; 345/211; 345/619
(58) Field of Classification Search .................. 345/8, 345/207, 211, 419, 84, 88, 32, 619, 426, 3.1; 250/226, 201.9, 208.1, 573; 356/326; 359/15, 359/573, 636; 358/450, 504; 378/87
See application file for complete search history.

(56) References Cited

U.S. PATENT DOCUMENTS

| | | | | |
|---|---|---|---|---|
| 4,113,353 | A | * | 9/1978 | Matsushita ................... 359/636 |
| 5,300,942 | A | * | 4/1994 | Dolgoff ........................ 345/32 |
| 5,729,011 | A | | 3/1998 | Sekiguchi |
| 5,933,277 | A | * | 8/1999 | Troxell et al. ............... 359/573 |

(Continued)

FOREIGN PATENT DOCUMENTS

DE    195 06 648 C2    8/1996

(Continued)

OTHER PUBLICATIONS

International Search Report.

*Primary Examiner*—Prabodh Dharia
(74) *Attorney, Agent, or Firm*—Patterson, Thuente, Skaar & Christensen, P.A.

(57) ABSTRACT

A method of spatial visualization in which several views are decomposed into bits of partial information, which are made optically visible by image rendering elements. Neighboring image rendering elements emit light of different wavelengths or wavelength ranges. Propagation directions for the light are given by wavelength filters such that an observer will see predominantly bits of partial information of a first selection of views with one eye and predominantly bits of partial information of a second selection with the other eye. At least one image rendering element is simultaneously allocated bits of partial information from at least two different views. The allocation is made in such a way that the wavelength of the partial information is always equal to the wavelength, or lies in the wavelength range, of the light emitted by the allocated image rendering element.

12 Claims, 8 Drawing Sheets

U.S. PATENT DOCUMENTS

| | | | |
|---|---|---|---|
| 6,005,916 A * | 12/1999 | Johnson et al. | 378/87 |
| 6,028,608 A * | 2/2000 | Jenkins | 345/619 |
| 6,157,041 A * | 12/2000 | Thomas et al. | 250/573 |
| 6,160,643 A * | 12/2000 | Deschuytere et al. | 358/504 |
| 6,175,431 B1 * | 1/2001 | Waldern et al. | 359/15 |
| 6,271,940 B1 * | 8/2001 | Deschuytere et al. | 358/504 |
| 6,351,321 B1 * | 2/2002 | McIntyre et al. | 358/450 |
| 6,452,595 B1 * | 9/2002 | Montrym et al. | 345/426 |
| 6,528,809 B1 * | 3/2003 | Thomas et al. | 250/573 |
| 6,816,141 B1 * | 11/2004 | Fergason | 345/88 |
| 7,075,643 B2 * | 7/2006 | Holub | 356/326 |
| 2003/0020703 A1 * | 1/2003 | Holub | 345/207 |
| 2005/0093796 A1 * | 5/2005 | Fergason | 345/88 |
| 2005/0280602 A1 * | 12/2005 | Tzschoppe et al. | 345/3.1 |

FOREIGN PATENT DOCUMENTS

| | | |
|---|---|---|
| DE | 198 27 590 C2 | 12/1999 |
| DE | 200 02 149 U 1 | 5/2000 |
| DE | 100 03 326 A1 | 8/2001 |
| WO | WO 98/27451 | 6/1998 |
| WO | WO 00/10332 | 2/2000 |
| WO | WO 00/28517 | 5/2000 |
| WO | WO 00/43831 | 7/2000 |
| WO | WO 01/56265 A2 | 8/2001 |

* cited by examiner

| (cij) | $g_{cij}$ |
|---|---|
| 111 | $1/d_f$ |
| 211 | $0,5/d_f$ |
| 311 | 0 |
| 411 | 0 |
| 511 | 0 |

| (cij) | $g_{cij}$ |
|---|---|
| 121 | 0 |
| 221 | $0,5/d_f$ |
| 321 | $1/d_f$ |
| 421 | 0 |
| 521 | 0 |

| (cij) | $g_{cij}$ |
|---|---|
| 131 | 0 |
| 231 | 0 |
| 331 | 0 |
| 431 | $1/d_f$ |
| 531 | $0,5/d_f$ |

| (cij) | $g_{cij}$ |
|---|---|
| 112 | 0 |
| 212 | $0,5/d_f$ |
| 312 | $1/d_f$ |
| 412 | 0 |
| 512 | 0 |

| (cij) | $g_{cij}$ |
|---|---|
| 122 | 0 |
| 222 | 0 |
| 322 | 0 |
| 422 | $1/d_f$ |
| 522 | $0,5/d_f$ |

| (cij) | $g_{cij}$ |
|---|---|
|  |  |
|  |  |
| ... |  |
| 413 | $1/d_f$ |
| 513 | $0,5/d_f$ |

Fig.3

| i\j | 1 R | 2 G | 3 B | 4 R | 5 G | 6 B | 7 R | 8 G | 9 B |
|---|---|---|---|---|---|---|---|---|---|
| 1 | 1/df *1<br>0,5/df *2 | 0,5/df *2<br>1/df *3 | 1/df *4<br>0,5/df *5 | 0,5/df *5<br>1/df *6 | 1/df *7<br>0,5/df *8 | 0,5/df *8<br>1/df *9 | 1/df *10<br>0,5/df *11 | 0,5/df *11<br>1/df *12 | 1/df *1<br>0,5/df *2 |
| 2 | 0,5/df *2<br>1/df *3 | 1/df *4<br>0,5/df *5 | 0,5/df *5<br>1/df *6 | 1/df *7<br>0,5/df *8 | 0,5/df *8<br>1/df *9 | 1/df *10<br>0,5/df *11 | 0,5/df *11<br>1/df *12 | 1/df *1<br>0,5/df *2 | 0,5/df *2<br>1/df *3 |
| 3 | 1/df *4<br>0,5/df *5 | 0,5/df *5<br>1/df *6 | 1/df *7<br>0,5/df *8 | 0,5/df *8<br>1/df *9 | 1/df *10<br>0,5/df *11 | 0,5/df *11<br>1/df *12 | 1/df *1<br>0,5/df *2 | 0,5/df *2<br>1/df *3 | 1/df *4<br>0,5/df *5 |
| 4 | 0,5/df *5<br>1/df *6 | 1/df *7<br>0,5/df *8 | 0,5/df *8<br>1/df *9 | 1/df *10<br>0,5/df *11 | 0,5/df *11<br>1/df *12 | 1/df *1<br>0,5/df *2 | 0,5/df *2<br>1/df *3 | 1/df *4<br>0,5/df *5 | 0,5/df *5<br>1/df *6 |
| 5 | 1/df *7<br>0,5/df *8 | 0,5/df *8<br>1/df *9 | 1/df *10<br>0,5/df *11 | 0,5/df *11<br>1/df *12 | 1/df *1<br>0,5/df *2 | 0,5/df *2<br>1/df *3 | 1/df *4<br>0,5/df *5 | 0,5/df *5<br>1/df *6 | 1/df *7<br>0,5/df *8 |
| 6 | 0,5/df *8<br>1/df *9 | 1/df *10<br>0,5/df *11 | 0,5/df *11<br>1/df *12 | 1/df *1<br>0,5/df *2 | 0,5/df *2<br>1/df *3 | 1/df *4<br>0,5/df *5 | 0,5/df *5<br>1/df *6 | 1/df *7<br>0,5/df *8 | 0,5/df *8<br>1/df *9 |
| 7 | 1/df *10<br>0,5/df *11 | 0,5/df *11<br>1/df *12 | 1/df *1<br>0,5/df *2 | 0,5/df *2<br>1/df *3 | 1/df *4<br>0,5/df *5 | 0,5/df *5<br>1/df *6 | 1/df *7<br>0,5/df *8 | 0,5/df *8<br>1/df *9 | 1/df *10<br>0,5/df *11 |
| 8 | 0,5/df *11<br>1/df *12 | 1/df *1<br>0,5/df *2 | 0,5/df *2<br>1/df *3 | 1/df *4<br>0,5/df *5 | 0,5/df *5<br>1/df *6 | 1/df *7<br>0,5/df *8 | 0,5/df *8<br>1/df *9 | 1/df *10<br>0,5/df *11 | 0,5/df *11<br>1/df *12 |
| 9 | 1/df *1<br>0,5/df *2 | 0,5/df *2<br>1/df *3 | 1/df *4<br>0,5/df *5 | 0,5/df *5<br>1/df *6 | 1/df *7<br>0,5/df *8 | 0,5/df *8<br>1/df *9 | 1/df *10<br>0,5/df *11 | 0,5/df *11<br>1/df *12 | 1/df *1<br>0,5/df *2 | n=12  df=1,5

| j\i | 1 | 2 | 3 | 4 | 5 | 6 | 7 | 8 | 9 |
|---|---|---|---|---|---|---|---|---|---|
| 1 | 1/df *1<br>0,7/df *2 | 0,3/df *2<br>1/df *3<br>0,4/df *4 | 0,6/df *4<br>1/df *5<br>0,1/df *6 | 0,9/df *6<br>0,8/df *7 | 0,2/df *7<br>1/df *8<br>0,5/df *9 | 0,5/df *9<br>1/df *10<br>0,2/df *11 | 0,8/df *11<br>0,9/df *12 | 0,1/df *12<br>1/df *1<br>0,6/df *2 | 0,4/df *2<br>1/df *3<br>0,3/df *4 |
| 2 | 0,3/df *2<br>1/df *3<br>0,4/df *4 | 0,6/df *4<br>1/df *5<br>0,1/df *6 | 0,9/df *6<br>0,8/df *7 | 0,2/df *7<br>1/df *8<br>0,5/df *9 | 0,5/df *9<br>1/df *10<br>0,2/df *11 | 0,8/df *11<br>0,9/df *12 | 0,1/df *12<br>1/df *1<br>0,6/df *2 | 0,4/df *2<br>1/df *3<br>0,3/df *4 | 0,7/df *4<br>1/df *5 |
| 3 | 0,6/df *4<br>1/df *5<br>0,1/df *6 | 0,9/df *6<br>0,8/df *7 | 0,2/df *7<br>1/df *8<br>0,5/df *9 | 0,5/df *9<br>1/df *10<br>0,2/df *11 | 0,8/df *11<br>0,9/df *12 | 0,1/df *12<br>1/df *1<br>0,6/df *2 | 0,4/df *2<br>1/df *3<br>0,3/df *4 | 0,7/df *4<br>1/df *5 | 1/df *6<br>0,7/df *7 |
| 4 | 0,9/df *6<br>0,8/df *7 | 0,2/df *7<br>1/df *8<br>0,5/df *9 | 0,5/df *9<br>1/df *10<br>0,2/df *11 | 0,8/df *11<br>0,9/df *12 | 0,1/df *12<br>1/df *1<br>0,6/df *2 | 0,4/df *2<br>1/df *3<br>0,3/df *4 | 0,7/df *4<br>1/df *5 | 1/df *6<br>0,7/df *7 | 0,3/df *7<br>1/df *8<br>0,4/df *9 |
| 5 | 0,2/df *7<br>1/df *8<br>0,5/df *9 | 0,5/df *9<br>1/df *10<br>0,2/df *11 | | | | | 0,3/df *6<br>1/df *7<br>0,4/df *8 | 0,3/df *7<br>1/df *8<br>0,4/df *9 | 0,6/df *9<br>1/df *10<br>0,1/df *11 |

$df = 1,7$ $n = 12$ $n/d_f * p_t$

METHOD FOR AUTO-STEREOSCOPIC IMAGE DISPLAY WITH A WAVELENGTH FILTER ARRAY

FIELD OF THE INVENTION

The invention relates to a method of spatial visualization of a scene or an object on the basis of several views $A_c$ of the scene or object, in which the views $A_c$ on matrices $R_c$ with columns k and rows l are decomposed into many bits of partial information $a_{ckl}$ characterized by their wavelengths, with c=1, . . . ,n and n being the total number of views, and in which the bits of partial information $a_{ckl}$ are optically presented on image rendering elements $\alpha_{ij}$ arranged in a matrix of columns i and rows j, and in which neighbored image rendering elements $\alpha_{ij}$ emit light of different wavelengths or wavelength ranges, and in which propagation directions for the emitted light are given by one or several arrays of many individual wavelength filters arranged in columns and rows, which are transparent for different wavelengths or wavelength ranges and arranged (in viewing direction) in front of or behind the matrix of image rendering elements, so that each individual image rendering element corresponds with several correlated wavelength filters or each wavelength filter corresponds with several correlated image rendering elements in such a way that the straight line connecting the centroid of the cross-section area of the visible segment of an image rendering element and the centroid of the cross-section area of the visible segment of the wavelength filter corresponds to a propagation direction, so that, from every observation position, an observer will see predominantly bits of partial information of a first selection with one eye and predominantly bits of partial information of a second selection of the views $A_c$ with the other eye; and the invention further relates to the problem of the quality of perception of three-dimensional visualizations.

DESCRIPTION OF PRIOR ART

Many known methods of spatial visualization are based on the spatial or spatial-temporal fragmentation of different views of a scene on an image display device. As a rule, the views are either a stack of images taken at different depth layers or images taken from different perspectives. Among image display devices, LC displays, e.g., are gaining widespread application. For example, U.S. Pat. No. 5,936,774 describes a method and arrangement for the autostereoscopic visualization of between two and four perspective views on an LC display. EP 0 791 847, EP 0 783 825, and JP 8 194 190 also describe arrangements for autostereoscopic visualization based on LC displays. German Patent Application 100 03 326.1/51 describes a method and arrangements for visualizing several views of a scene.

The disadvantage of all the arrangements and methods described is that the maximum number of views that can be displayed is limited by the number of image rendering elements of the LC display insofar as it must be ensured that a sufficient number of image rendering elements are available to each view. Each image rendering element is assigned a bit of partial information of a view, which is displayed by the element, the partial information being characterized by its wavelength, if, e.g., bits of partial information from eight views are evenly distributed over a typical LC display with a resolution of 1024×768 pixels, even if the RGB subpixel structure is utilized, only about 295,000 subpixels are available to each view. Although a three-dimensional visualization is accomplished in this way, the perspective images will, in most cases, appear to the observer to be distinctly impaired in resolution. To improve the spatial effect, it would be desirable nevertheless to use as many perspective images as possible so as to give a quasi-continuous impression. However, already with no more than 40 views, only about 59,000 subpixels per view will be available on an LC display of the size mentioned above. This impairs the quality of three-dimensional visualization. One could, of course, use a greater number of image rendering elements, but this cannot be implemented without greater technical outlay and higher cost. Moreover, there are manufacturing limits to the resolutions that can be implemented with the various types of image display devices.

Another disadvantage in using a reduced number of views is the occurrence of pseudoscopic effects. In the transition regions where the propagation directions of two views overlap, or where two views merge, a slight movement of the observer's head may cause a jump of the image. This effect is the greater, the more the two views differ in spatial depth or in perspective. If the views are staggered according to their spatial depth or their perspective, the effect is particularly great in the region where the first and last views merge.

To ensure correct visualization, allowance must also be made for the theorem of intersecting lines. Because of the theorem of intersecting lines it is necessary in arrangements using the method described that the components arranged one behind the other be of slightly differing sizes. If, for example, the wavelength filter array is arranged (in viewing direction) in front of the matrix of image rendering elements, the filter elements must have a height and width reduced by a factor of $f=d_a/(z+d_a)$ relative to the image rendering elements in order to conform to the theorem of intersecting lines, with z denoting the distance between the matrix of image rendering elements and the array of wavelength filters, and $d_a$ denoting a selectable viewing distance that essentially corresponds to the mean of all distances, possible in the viewing space, between the matrix of image rendering elements and an observer or a viewing position. It is common, therefore, to design the filter elements of the filter arrays somewhat smaller than the image rendering elements of the image display device. This has the obvious disadvantage that components have to be made of different sizes, whereas it would be desirable, for economic reasons, to make components of identical sizes, especially if both the filter array and the matrix of image rendering elements are conceived as LC displays. Another, more serious disadvantage is the fact that the visualization cannot be flexibly adapted to changing viewing distances: The distance z between filter array and matrix of image rendering elements is calculated, for the arrangement described, by the equation $z=s_p*d_a/p_d$, with $s_p$ denoting the width of an image rendering element, $p_d$ the mean distance between the eye pupils of an observer, and $d_a$ the mean viewing distance introduced above. This means that a particular filter array is, in principle, made exactly for one optimum mean distance. With any other distance, the quality of the visualization will be impaired. What is desirable, though, is a uniformly good quality of visualization within a greater range of distances. If the image display device is an LC display, a single observer will be positioned, e.g., at a distance of about 25 cm from the screen, whereas a small group of observers will be positioned at a greater distance of, say, 50 to 100 cm.

DESCRIPTION OF THE INVENTION

Proceeding from the prior art as described, it is the objective of the invention to improve the quality of image rendition in a method of three-dimensional visualization.

According to the invention, the objective, in a method of the type described above, is achieved by allocating bits of partial information from at least two different views at a time to at least one image rendering element, this allocation being effected in such a way that the wavelength of the partial information is always equal to the wavelength, or lies in the wavelength range, of the light emitted by the allocated image rendering element.

If bits of partial information from different views are simultaneously rendered by at least one image rendering element, more views can be used with an image display device of a particular resolution. A greater number of views corresponds to a denser staggering in spatial depth or in perspective, so that the three-dimensional impression is improved. Moreover, the change between views is less of a jump. The number of image rendering elements on which bits of partial information from different views are simultaneously rendered depends on the number of image rendering elements available and on the number of views to be visualized.

It is expedient to allocate the bits of partial information $a_{ckl}$ to the image rendering elements $\alpha_{ij}$ according to the rule $$\alpha_{ij} = \sum_c \sum_k \sum_l a_{ckl} \cdot g_{cklij} \qquad (1)$$

where g is a fifth-order tensor, the elements $g_{cklij}$ of which are real numbers and have the effect of weighting factors determining the weight of the respective partial information $a_{ckl}$ in an image rendering element $\alpha_{ij}$. The indices c, k and l vary from 1 to the respective maximum, so that all possible combinations are obtained. In addition, if eq. (1) is applied, it is possible to combine bits of partial information from views of different sizes without size conversion, which otherwise would be necessary.

In a preferred embodiment of the method, the index k is equaled with i, the index l is equaled with j, and the bits of partial information are allocated to the image rendering elements according to the rule $$\alpha_{ij} = \sum_c a_{cij} g_{cij}(d_f) \qquad (2)$$

In this way, each image rendering element is allocated bits of partial information of the same position (i, j) only in the matrices of the views. The quantity $d_f$ is a density factor, which can adopt real numbers as values and which states the number of views from which bits of partial information are allocated to an image rendering element on average. For each image rendering element, the weighted sum of the allocated bits of partial information is normalized to 1, i.e., for all pairs (i, j), $$\sum_c g_{cij} = 1.$$

In an expedient embodiment of this simplified method, the weighting factors $g_{cij}$ are generated by the rule $$d_f \cdot g_{cij} = \qquad (3)$$
$$\delta((Rnd[(i+j-1) \cdot d_f] - 1 \mod n + 1 - c) \cdot [Frac((i+j-1) \cdot d_f) \cdot$$
$$\delta(\delta(Frac[(i+j-1) \cdot d_f])) + \delta(Trac[(i+j-1) \cdot d_f])] +$$
$$\delta((Rnd[(i+j-2) \cdot d_f] - 1 + \delta(Frac[i+j-2) \cdot d_f])) \mod n +$$
$$1 - c) \cdot [1 - Frac[(i+j-2) \cdot d_f]] +$$
$$\sum_{t=Rnd[(i+j-2) \cdot d_f] + \delta(Frac[(i+j-2) \cdot d_f])+1}^{Rnd[(i+j-1) \cdot d_f]-1} \delta([t-1] \mod n + 1 - c)$$

the density factor being equal for all image rendering elements and adopting a value greater than 1, preferably between 1.3 and 2.0. $\delta(x)$ is a function satisfying the conditions $\delta(x=0)=1$ and $\delta(x \neq 0)=0$. Rnd(x) is a function supplying, for arguments $x \geq 0$, the next higher integer as a function value if the part of the argument x behind the decimal point is not equal to zero; if this is not the case, the function supplies the argument x itself. "mod" designates the residue class relating to a divisor. Frac(x) is a function supplying, for arguments $x \geq 0$, the part of argument x behind the decimal point as a function value, and t is an integer; the sum is assigned the value "zero" if the upper summation limit is smaller than the lower summation limit. Even with this somewhat simplified method it is possible, with the same screen resolution, to use a greater number of views, the shares of the bits of partial information from every view being sufficiently large to achieve a good visualization quality, as the density of image information in the viewing space is increased. Furthermore, a constant density factor ensures that all views are equally taken into account. Implicitly, the use of a constant density factor also makes it possible to achieve a brightness increase, since more light propagation directions can be defined for the same number of views employed than in conventional methods, which may be regarded as using a constant density factor $d_f=1$.

With the method according to the invention, a noticeable improvement in spatial visualization can be achieved especially if the quotient of the number of views and the density factor is not an integer. Firstly, this gives observers greater freedom of movement before they see the image jump, and secondly, transitions seen between views are less abrupt. With reference to arrangements embodying the method, the distance between the array of wavelength filters and the matrix of image rendering elements can be decreased, because more views are presented per unit of image area and, thus, more selections of views are available in the viewing space.

It should be pointed out here that, although the aforementioned circumstances influence the propagation directions, the allocation of wavelength filters to an image rendering element, or of image rendering elements to a wavelength filter, does not change, as these are all permanently positioned. Further it should be noted that a technically equivalent embodiment of the invention may involve the use not of filter arrays but of lenticulars instead, which also allow light propagation directions to be defined. As a matter of course, the method can also be implemented with monochrome image display devices; in this case, all image rendering elements emit light of the same wavelength or the same wavelength range.

Further it should be noted that the elements of the tensor in eq. (3) are preferably symmetric with regard to rows and columns, i.e. the condensation—the increase in the density of the bits of partial information rendered by one image rendering element—is effected for rows in the same way as for columns. Eq. (2) is of a more general nature, including also the case of asymmetric condensation, i.e. if a condensation is intended only for rows or only for columns, or if different degrees of condensation are intended for columns and rows. The latter case corresponds to the use of two disjoint density factors: one for vertical ($d_{fy}$) and one for horizontal condensation ($d_{fx}$). In the following, we proceed again from eq. (2), however with the third-order weighting tensor now depending on the disjoint density factors $d_{fy}$ and $d_{fx}$ rather than the (general) density factor $d_f$.

Before the application of eq. (2), the weighting tensor $g_{cij}$ for every triple (c,i,j) is determined from the equation $$g_{cij} = \frac{1}{d_{fx} \cdot d_{fy}} \cdot \delta_{inv}(Frac(e_{xa})) \cdot (Rnd(e_{xa}) - e_{xa}) \cdot \delta_{inv}(Frac(e_{ya})) \cdot \quad (3a)$$

$$(Rnd(e_{ya}) - e_{ya}) \cdot \delta(c - EZ(Int(e_{xa}), Int(e_{ya}))) +$$

$$\frac{1}{d_{fx} \cdot d_{fy}} \delta_{inv}(Frac(e_{xa})) \cdot (Rnd(e_{xa}) - e_{xa}) \cdot$$

$$\delta_{inv}(Frac(e_{ye})) \cdot (Frac(e_{ye})) \cdot \delta(c - EZ(Int(e_{xa}), Int(e_{ye}))) +$$

$$\frac{1}{d_{fx} \cdot d_{fy}} \delta_{inv}(Frac(e_{xe})) \cdot Frac(e_{xe}) \cdot \delta_{inv}(Frac(e_{ye})) \cdot$$

$$(Frac(e_{ye})) \cdot \delta(c - EZ(Int(e_{xe}), Int(e_{ye}))) +$$

$$\frac{1}{d_{fx} \cdot d_{fy}} \delta_{inv}(Frac(e_{xe})) \cdot Frac(e_{xe}) \cdot \delta_{inv}(Frac(e_{ya})) \cdot$$

$$(Rnd(e_{ya}) - e_{ya}) \cdot \delta(c - EZ(Int(e_{xe}), Int(e_{ya}))) +$$

$$\sum_{q_k=Rnd(e_{ya})}^{int(e_{ye})-1} \frac{1}{d_{fx} \cdot d_{fy}} \delta_{inv}(Frac(e_{xa})) \cdot (Rnd(r_{xa}) - e_{xa}) \cdot$$

$$\delta(c - EZ(Int(e_{xa}), Int(q_k))) + \sum_{p_k=Rnd(e_{xa})}^{int(e_{xe})-1} \frac{1}{d_{fx} \cdot d_{fy}} \cdot$$

$$\delta_{inv}(Frac(e_{ye})) \cdot Frac(e_{ye}) \cdot \delta(c - EZ(Int(p_k), Int(e_{ye}))) +$$

$$\sum_{q_k=Rnd(e_{ya})}^{int(e_{ye})-1} \frac{1}{d_{fx} \cdot d_{fy}} \cdot \delta_{inv}(Frac(e_{xe})) \cdot Frac(e_{xe}) \cdot$$

$$\delta(c - EZ(Int(e_{xe}), Int(q_k))) +$$

$$\sum_{q_k=Rnd(e_{xa})}^{int(e_{xe})-1} \frac{1}{d_{fx} \cdot d_{fy}} \cdot \delta_{inv}(Frac(e_{ya})) \cdot (Rnd(e_{ya}) - e_{ya}) \cdot$$

$$\delta(c - EZ(Int(p_k), Int(e_{ya}))) +$$

$$\sum_{q_k=Rnd(e_{ya})}^{int(e_{ye})-1} \sum_{q_k=Rnd(e_{xa})}^{int(e_{xe})-1} \frac{1}{d_{fx} \cdot d_{fy}} \cdot \delta(c - EZ(Int(p_k), Int(q_k)))$$

wherein $e_{xa}$, $e_{xe}$, $e_{ya}$ and $e_{ye}$ are auxiliary variables that apply to the relations $$e_{xa} = i \cdot d_{fx} + \text{offset}_{ex}$$

$$e_{xe} = (i+1) \cdot d_{fx} + \text{offset}_{ex}$$

$$e_{ya} = j \cdot d_{fy} + \text{offset}_{ey}$$

$$e_{ye} = (j+1) \cdot d_{fy} + \text{offset}_{ey}$$

A sum is assigned the value of "zero" if the upper summation limit is smaller than the lower summation limit. Furthermore, the relationships $\delta_{inv}(x) = \delta(\delta(x))$, i.e. $\delta_{inv}(x=0) = 0$ and $\delta_{inv}(x \neq 0) = 1$ apply.

EZ(v,w) is a two-dimensional matrix with columns v and rows w, which defines an image combination pattern that is still uncondensed. An entry in a position (v,w) corresponds to the number of a particular view. The number of columns v in the matrix EZ(v,w) must at least be greater than the product $d_{fx}$*(number of columns i of image rendering elements $\alpha_{ij}$). Analogously, the product $d_{fy}$*(number of rows j of image rendering elements $\alpha_{ij}$) must be smaller than the number of rows w of the matrix EZ(v,w).

Preferably, but not necessarily, matrices EZ(v,w) are used that have horizontally and/or vertically periodic entries. An EZ(v,w), e.g., for an image combination pattern of 24 views may be given by the relationship EZ(v,w)=(3*v+2*w−1) mod 24+1.

For normalizing the position of the views in the condensed image, the values $\text{offset}_{ex} = (d_{fx}-1)*j - (2*d_{fx}-2)$ and $\text{offset}_{ey} = (d_{fy}-1)*i - (2*d_{fy}-2)$ can be set for i or j with each increase of the index. In the resultant dense combination image, then, the view at top left will be the one that occupies the position (v=1, w=1), i.e. the top left position, also in the matrix EZ(v,w). Alternatively, it is possible to set the offset values $\text{offset}_{ex} = \text{offset}_{ey} = 0$.

The above eq. (3a) is not suitable for density factors $d_{fx} < 1$ or $d_{fy} < 1$, though. These cases, which correspond to an expansion rather than a condensation, are treated hereunder.

With the aid of auxiliary variables $e_{xa}$, $e_{xe}$, $e_{ya}$ and $e_{ye}$, for which the relations $$e_{xa} = i \cdot d_{fx} + 1 - d_{fx}$$

$$e_{xe} = (i+1) \cdot d_{fx} + 1 - d_{fx}$$

$$e_{ya} = j \cdot d_{fy} + 1 - d_{fy}$$

$$e_{ye} = (j+1) \cdot d_{fy} + 1 - d_{fy}$$

apply, the elements of the weighting tensor $g_{cij}$ at density factors $d_{fx} \leq 1$ and $d_{fy} \leq 1$, i.e. actually at expansion factors, are determined, again for each triple (c,i,j). However, a distinction is made between four different cases.

For the first case, with $Int(e_{xe}) \geq e_{xa}$ and $Int(e_{ye}) \geq e_{ya}$, the equation is:

$$g_{cij} = \begin{bmatrix} (Int(e_{xe}) - e_{xa}) \cdot (Int(e_{ye}) - e_{ya}) \cdot \delta(c - EZ(Int(e_{xa}), Int(e_{ya}))) + \\ (e_{xe} - Int(e_{xe})) \cdot (Int(e_{ye}) - e_{ya}) \cdot \delta(c - EZ(Int(e_{xe}), Int(e_{ya}))) + \\ (Int(e_{xe}) - e_{xa}) \cdot (e_{ye} - Int(e_{ye})) \cdot \delta(c - EZ(Int(e_{xa}), Int(e_{ye}))) + \\ (e_{xe} - Int(e_{xe})) \cdot (e_{ye} - Int(e_{ye})) \cdot \delta(c - EZ(Int(e_{xe}), Int(e_{ye}))) \end{bmatrix} \quad (3b)$$

$$\frac{1}{d_{fx} \cdot d_{fy}}.$$

For the second case, with $Int(e_{xe}) < e_{xa}$ and $Int(e_{ye}) \geq e_{ya}$, the equation is:

$$g_{cij} = \begin{bmatrix} (e_{xe} - e_{xa}) \cdot (Int(e_{ye}) - e_{ya}) \cdot \delta(c - EZ(Int(e_{xa}), Int(e_{ya}))) + \\ (e_{xe} - e_{xa}) \cdot (e_{ye} - Int(e_{ye})) \cdot \delta(c - EZ(Int(e_{xa}), Int(e_{ye}))) \end{bmatrix} \quad (3c)$$

$$\frac{1}{d_{fx} \cdot d_{fy}}.$$

For the third case, with $\text{Int}(e_{xe}) \geq e_{xa}$ and $\text{Int}(e_{ye}) < e_{ya}$, the equation is:

$$g_{cij} = \begin{bmatrix} (\text{Int}(e_{xe}) - e_{xa}) \cdot (e_{ye} - e_{ya}) \cdot \delta(c - EZ(\text{Int}(e_{xa}), \text{Int}(e_{ya}))) + \\ (e_{xe} - \text{Int}(e_{xe})) \cdot (e_{ye} - e_{ya}) \cdot \delta(c - EZ(\text{Int}(e_{xe}), \text{Int}(e_{ya}))) \end{bmatrix} \cdot \frac{1}{d_{fx} \cdot d_{fy}}. \quad (3d)$$

For the fourth case, with $\text{Int}(e_{xe}) < e_{xa}$ and $\text{Int}(e_{ye}) < e_{ya}$, the equation is:

$$g_{cij} = [(e_{ye} - e_{ya}) \cdot (e_{xe} - e_{xa}) \cdot \delta(c - EZ(\text{Int}(e_{xa}), \text{Int}(e_{ya})))] \cdot \frac{1}{d_{fx} \cdot d_{fy}}. \quad (3e)$$

The above equations cover all possible cases.

By the way, this rule for establishing the weighting tensor $g_{cij}$ also ensures that $$\sum_c g_{cij} = 1.$$

is valid for all pairs (i,j).

With the rules given here for the density factors $d_{fx}$ and $d_{fy}$ it is possible to specify condensations or expansions of different degrees for the horizontal and vertical directions. This possibility is a great advantage especially if condensed or expanded images are to be created for filter arrays in which the periodicities of the transparent or translucent filter elements in the vertical direction are different from those in the horizontal direction. Further advantages result for the case that the given matrix EZ(v,w) has different periodicities in the vertical and horizontal directions.

Under the respective conditions, the equations are, of course, also applicable for the case that $d_{fx} = d_{fy}$. For the rare cases that $d_{fx} \leq 1$ and, simultaneously, $d_{fy} > 1$, or that $d_{fx} > 1$ and, simultaneously, $d_{fy} \leq 1$, no separate equation is given here, but these cases are completely covered by eqs. (1) and (2).

It is also possible, in this connection, to consider a time-dependent application, in which the views of the scene are divided into at least two sets, with the views recorded from different perspectives but with a common vanishing point, the number of views differing from set to set, the angle between two views of the same set being always equal, and the views at the extreme left and right ends being equal in all sets. The views of every set are combined with each other according to the above equations, with a separate density factor being allocated to every set; the density factor may, for example, be selected so as to make the quotient of the number of views of a set and the density factor of this set constant for all sets. If the combination images thus generated are displayed in rapid succession, alternating at a frequency above the limit frequency at which it would still be perceived by the human eye as a flicker, the spatial impression is refined, as the observer sees a mix of all views.

By means of the weighted allocation it is also possible to achieve that bits of partial information appear shifted in accordance with their weight shares. If, e.g., each of two adjacent image rendering elements is allocated one half of the same bit of information, this information will appear exactly in the middle between the two elements. If the weighting is made so as to be variable in time, the quality of visualization in a stereoscopic tracking method can be improved, as the image content can be made to continuously track the observer's eye position, and jumps otherwise caused by the discrete number of image rendering elements and their extension can be largely avoided. Moving optical systems are not required in this case either, which is a big advantage.

In another expedient embodiment of the invention, the density factor is determined by the rule $d_f = f$, where f is a positive real number determined by the rule $f = d_a/z + d_a$. z is the distance between the matrix of image rendering elements and the array of wavelength filters, and $d_a$ is a selectable viewing distance essentially corresponding to the mean of all distances possible throughout the viewing space between the matrix of image rendering elements and an observer or a viewing position. By assigning the density factor the value f, which explicitly depends on the distance between the array of wavelength filters and the matrix of image rendering elements, one can correct the allocation of the bits of partial information (i.e. adapt it to the theorem of intersecting lines) in such a way that it corresponds to the physical contour with the correction factor f. This makes two things possible: First, wavelength filter arrays and the matrix of image rendering elements have the same dimensions, which facilitates the manufacturing of arrangements that use such a method. Second, as the mean viewing distance enters the density factor, this can easily be adapted to varied distances of an observer or group of observers, so that the quality of the visualization is improved. A combination of this allocation rule with a tracking method is also feasible, in which the density factor can be continuously adapted to the distance of an observer or the mean distance of several observers.

Another advantageous embodiment of the invention permits the image visualized on an image display device to be adapted to a given filter array that is generally suitable for 3D visualization according to the generic term given in the main claim.

As a rule, such a filter array is generated for a particular image display device with a fixed horizontal and/or vertical image rendering element period. Within the scope of the invention, the image display device can, by means of image generation according to eq. (2) and, e.g., eq. (3), be controlled in such a way that the image display device can be used in combination with a filter array fabricated originally for 3D visualization in conjunction with an image display device with a different horizontal and/or vertical image rendering element period.

Provided that this filter array has already been made with a certain correction factor f and that the filter array is arranged at the same distance in front of the said image display device, the density factor is now set to be $d_f = C_{h2}/C_{h1}$, where $C_{h1}$ is the horizontal image rendering element period of the image display device for which the filter array was originally made. Accordingly, $C_{h2}$ is the horizontal image rendering element period of the image display device used in combination with method according to the invention. If the distance z between the filter array and the image display device employed is varied, the density factor thus found may be multiplied by another correction factor f', for which $0.9 < f' 1.1$.

By means of the last-named advantageous embodiment version of the method according to the invention it is also possible, for example, to generate a filter array disk for a particular horizontal image rendering element period and to use it on image display devices having different parameters.

For example, a rectangular filter array with a diagonal of about 15" could be laminated with a disk optimized for an horizontal image rendering element period of 299 μm. If this filter array disk is to be used on a 15" image display device with a 302 μm period, the image to be visualized can easily be generated according to eqs. (2) and (3), with $d_f$=302 μm/299 μm=1.010033444.

After use on the said image display device, the filter array can easily be removed from it and used on yet another image display device.

In the application outlined last, if may further be expedient to use two disjoint density factors for the vertical and the horizontal as described before.

By dint of the doctrine of image combination using a tensor $g_{cklij}$ or a tensor $g_{cij}$ as described herein, it is possible, moreover, to compensate rotations (e.g. about the axis of the viewing direction) between the image display device and the filter array. In this case, the respective tensor not only provides for a condensed or expanded image combination but also, in a way, has the function of a rotation matrix, which allocates the visualized bits of partial information $a_{ckl}$ to the image rendering elements $\alpha_{ij}$ with a slight rotation that corresponds to the rotation between the image display device and the filter array.

In another preferred embodiment of the method, the weighting factors are generated by the rule $$g_{cij} \sum_{t=Rnd\left(\frac{d_f(i,j)-1}{2}\right)}^{Rnd\left(\frac{d_f(i,j)-1}{2}\right)} \delta\left(\left[i+j+t-1+Int\left(\frac{n}{2}\right)\right]\mathrm{mod}\, n+1-c\right)\cdot \tag{4}$$

$$\left\{\frac{1}{d_f(i,j)}\delta\left[Rnd\left(\frac{d_f(i,j)-1}{2}\right)-t\right]\cdot Frac\left(\frac{d_f(i,j)-1}{2}\right)+\frac{1}{d_f(i,j)}\right.$$

$$\delta\left[Rnd\left(\frac{d_f(i,j)-1}{2}\right)+t\right]\cdot Frac\left(\frac{d_f(i,j)-1}{2}\right)+\frac{1}{d_f(i,j)}$$

$$\left.\delta\left(\delta\left[Rnd\left(\frac{d_f(i,j)-1}{2}\right)-t\right]+\delta\left[Rnd\left(\frac{d_f(i,j)-1}{2}\right)+t\right]\right)\right\}$$

in which case the density factor depends on the position (i, j) in the matrix of image rendering elements. This version of the method suggests itself especially if the total number of views available is small. Above all, the explicit dependence of the density factor on the position offers the possibility that the effect of a jump-like change at the transitions from the last to the first view can be reduced in such a way that only in these positions, and possibly, in a reduced degree, in their vicinities, bits of partial information of the respective views are allocated to an image rendering element in condensed combination, whereas each of the image rendering element outside these positions only show the image information of only one view.

Preferably, the density factor in this embodiment is described by the function $$d_f = \frac{e^{\left[-\left(i+j-Int\left[\frac{i+j}{n}\right]-n\frac{n+1}{2}\right)^2\right]}}{C_{peak}} + d_f^{offset} \tag{5}$$

with a selectable, real and positive parameter $C_{peak}$, a selectable, real and positive parameter $d_f^{offset}$, which causes a shift of the function values towards higher values, and the function Int(x), which supplies as a function value the greatest integer that does not exceed the argument x.

Another possibility that opens up through the use of equations (1) and (2), and in which likewise not all image rendering elements are allocated bits of partial information of several views, is the allocation of bits of partial information from a number of m views to a number of s neighboring image rendering elements, with m being smaller than s. This is equivalent to an expanded image display. Some of the image rendering elements display bits of partial information of a single view only, whereas other image rendering elements are simultaneously allocated bits of partial information of several views. If, e.g., eight consecutive views are distributed over nine horizontally neighbored image rendering elements, the first image rendering element is allocated a bit of partial information of the first view only, whereas the second image rendering element is allocated ⅛ of a bit of partial information of the first view and ⅞ of a bit of partial information of the second view. The third image rendering element is allocated ⅔ of a bit of partial information of the second and ⅝ of a bit of partial information of the third view. The ninth image rendering element is allocated a bit of partial information of the eighth view only. This allocation is periodically repeated in each row.

In a practical configuration, the version described above can be embodied on a plasma screen, e.g., of a Sony PFM-42B display, that is equipped with a suitable filter array. This screen has a physical resolution of 1024×1024 pixels and can be driven with an image resolution of 1024×768, among others, the driving being based on a three-dimensional image, with each image rendering element showing image information from exactly one view. In actual image visualization, expansion takes place inherently in the vertical, as in the course of the visualization of 768 image information rows on 1024 actual image rendering element rows, the image information of three rows—which, in case of the control mode mentioned above, corresponds to three views, as a rule—is distributed over four physical rows of the screen. The quality of the three-dimensional visualization is improved insofar as the entire screen, rather than only part of it, is utilized without any compromise regarding the spatial impression.

BRIEF DESCRIPTION OF THE DRAWINGS

Below, the invention is described in detail with an example of an embodiment. Reference is made to the accompanying drawings, in which:

FIG. 4 shows the weighted allocation of the individual views to the image rendering elements on a matrix of RGB subpixels for n=12 views, with a density factor of $d_f$=1.5.

DETAILED DESCRIPTION OF THE DRAWINGS

Figure 1:
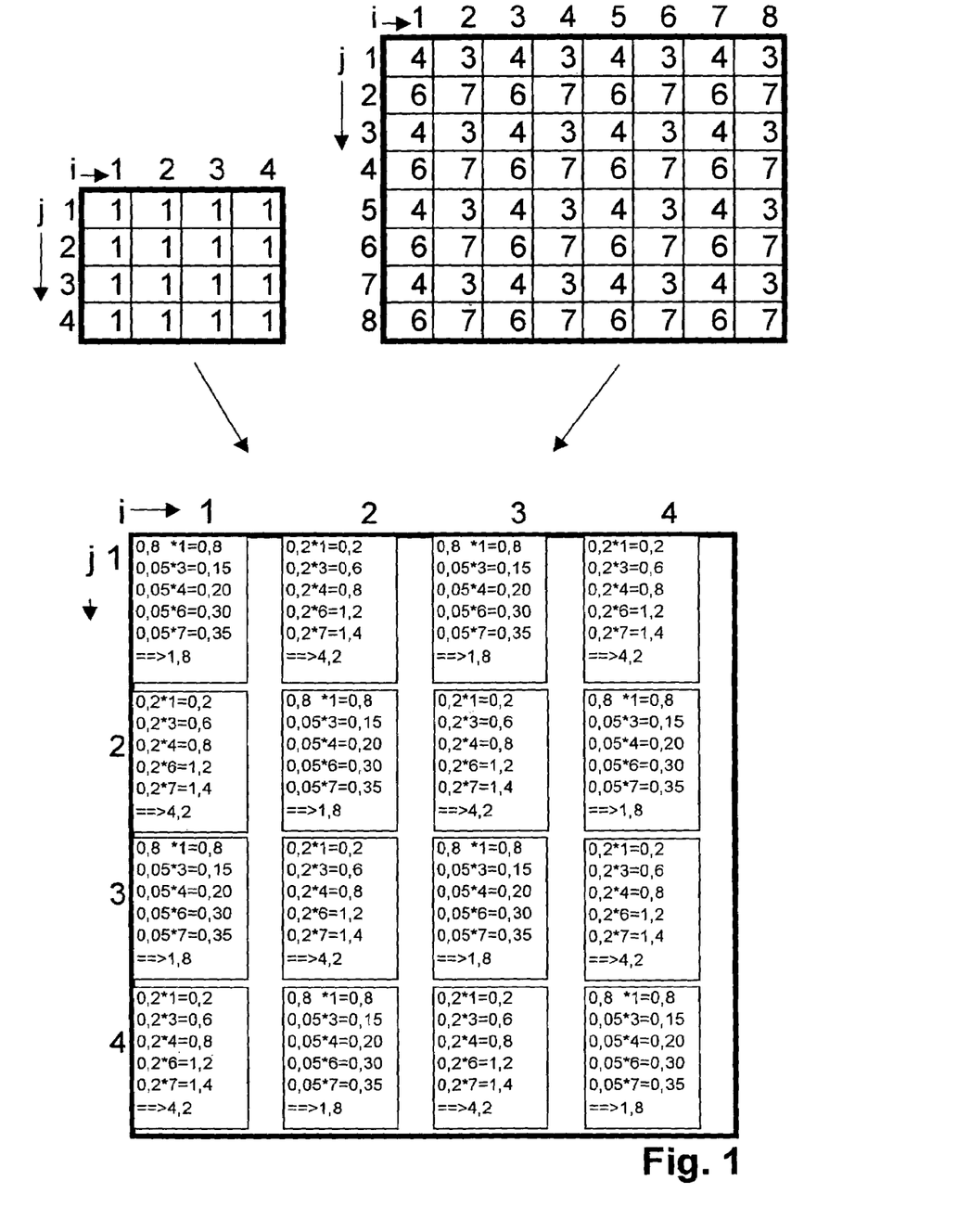
FIG. 1 shows an example of the condensed combination of bits of partial information of two views of different sizes.

FIG. 1 shows, for an example of two monochrome views sized 4×4 and 8×8, how bits of partial information of two views of different sizes can be condensed and combined using eq. (1), and visualized as one image. The numbers in the matrices represent monochrome color values, i.e. neutral gray levels. The condensed combination of the two views into one image of the size of the smaller view is shown in the bottom part of FIG. 1. Each bit of information of the view c=1 is combined with four bits of information of the view c=2. For the bits of information allocated to the image rendering element $\alpha_{11}$, the elements of the tensor shown in the example are selected as follows: $g_{11111}=0.8$ and $g_{21111}=g_{22111}=g_{22211}=g_{21211}=0.05$. These values are multiplied by the respective gray level of the image information; their sum yields the gray level of the image rendering element of the combination image.

Figure 2:
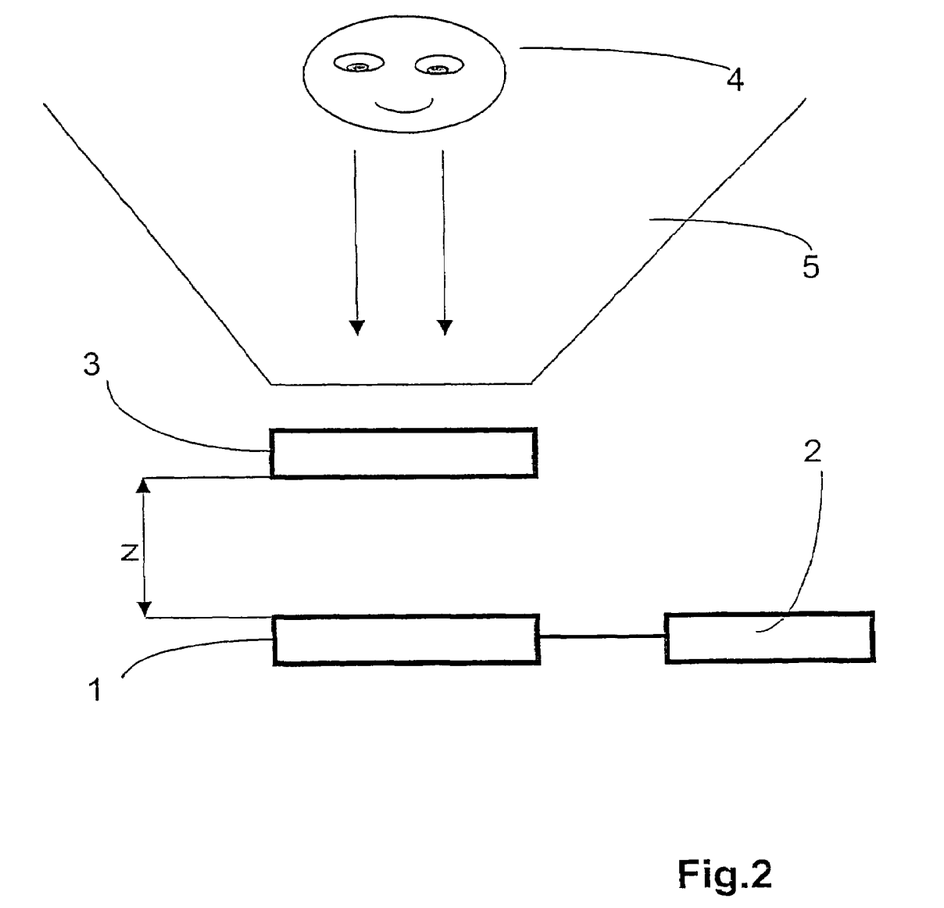
FIG. 2 shows an arrangement suitable for implementing the method, in which are arranged a wavelength filter array and behind it (in the viewing direction of an observer) a matrix of image rendering elements provided with drive electronics.

FIG. 2 shows an arrangement suitable for implementing the method according to the invention. The image display device in this case is a color LC display 1 with red (R), green (G) and blue (B) subpixels and provided with drive electronics 2, with each image rendering element corresponding to one R, G or B subpixel. The wavelength filter array 3 is a static one, e.g., in the form of a printed foil. Other arrangements are feasible as well, such as the use of another color LC display as the wavelength filter array 3, as far as the method works with these arrangements. In the example arrangement for implementing the method according to the invention, an observer 4 in a viewing space 5 first looks at the wavelength filter array 3, with the color LC display 1 arranged behind it.

Figure 3:
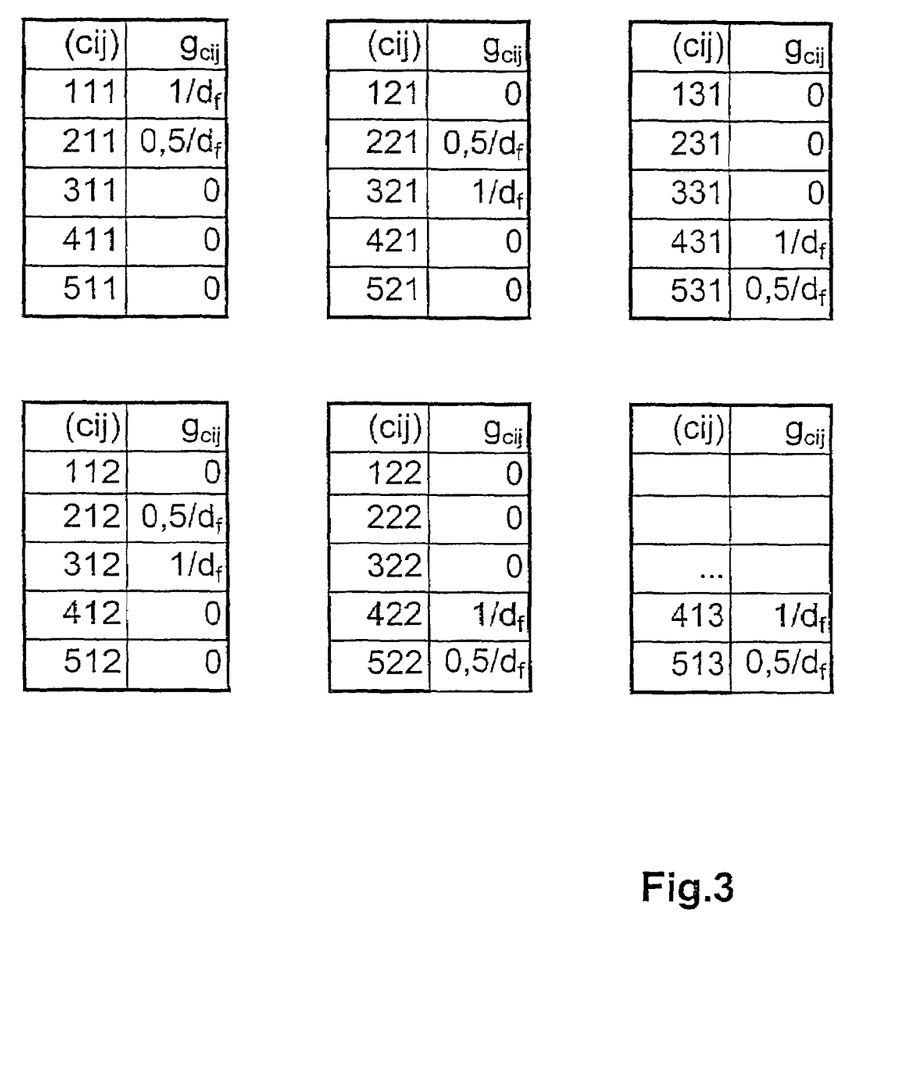
FIG. 3 shows, for some triples (c, i, j), values of the third-order tensor $g_{cij}$, generated according to eq. (2) with a factor $d_f$=1.5 for a total of n=12 views.

In the example, let 12 views be condensed each, both row- and columnwise with a constant density factor $d_f=1.5$. With a density factor of 1.5, 12 views can be displayed periodically, condensed on eight image rendering elements. Let the bits of partial information of the views, allocated to an image rendering element $\alpha_{ij}$ come from the same matrix position (i, j). Each image rendering element is allocated an average of 1.5 bits of partial information. For the third-order tensor $g_{cij}$ used here, the elements can be determined from eq. (2), some of which are given in FIG. 3 for several triples (c, i, j).

FIG. 4 shows a segment of the matrix of image rendering elements for the configuration selected. Each box represents one image rendering element. The entries in the boxes are the numbers of the views from which the bits of partial information have been allocated to the image rendering element, together with the weighting as a corrective factor.

Figure 5:
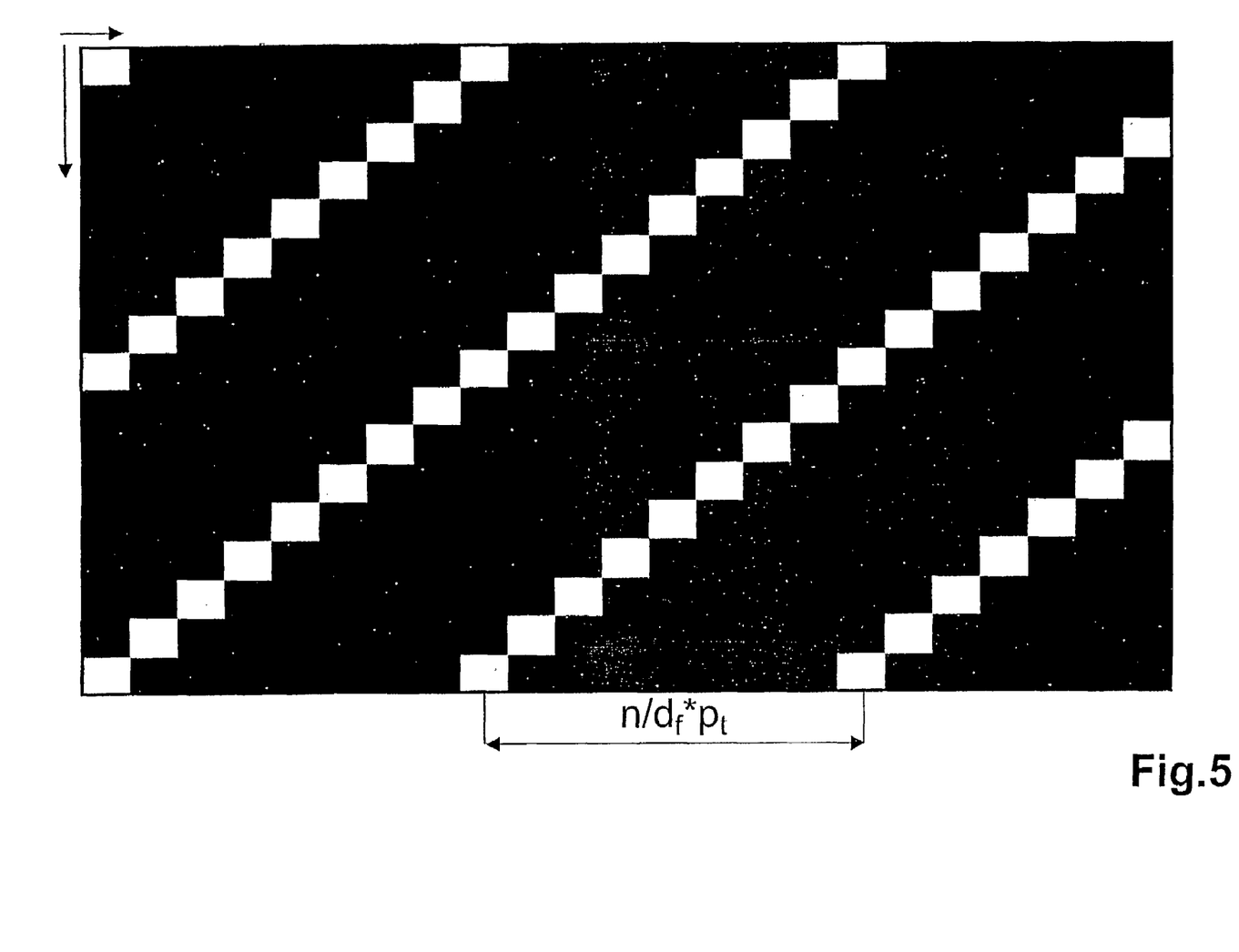
FIG. 5 shows a wavelength filter array of transparent and opaque filters.

FIG. 5 shows a filter array of the kind that can be used in the example arrangement for implementing the method, although it is not specially tailored to this method. The wavelength filter array shown in a typical configuration consists of a foil printed with transparent and opaque filters, which are identified here by white and black areas, respectively. Colored wavelength filters are feasible as well, same as a wavelength filter array provided with a second set of drive electronics that is used for varying the transparent wavelength areas. The height and width of the filter elements are essentially equal to the dimensions of the image rendering elements; the width of the filter elements is designated $\rho_f$. It should be noted here that the illustrations of matrices of image rendering elements and wavelength filter arrays shown here are not to scale, and that each shows a segment of a matrix or array only. In the method of prior art, in which the partial information of only one view is allocated to one image rendering element, the array shown in FIG. 5 is designed for the visualization of eight views: In each row and each column, there is a transparent filter in every eighth matrix position. With a density factor of 1.5 it is possible to visualize 12 views in such a way that the same filter array can be used. Implicitly this is equivalent to a brightness increase, as the number of the transparent filters is greater than it would be for a wavelength filter array designed for 12 views by the prior art method.

Figure 6:
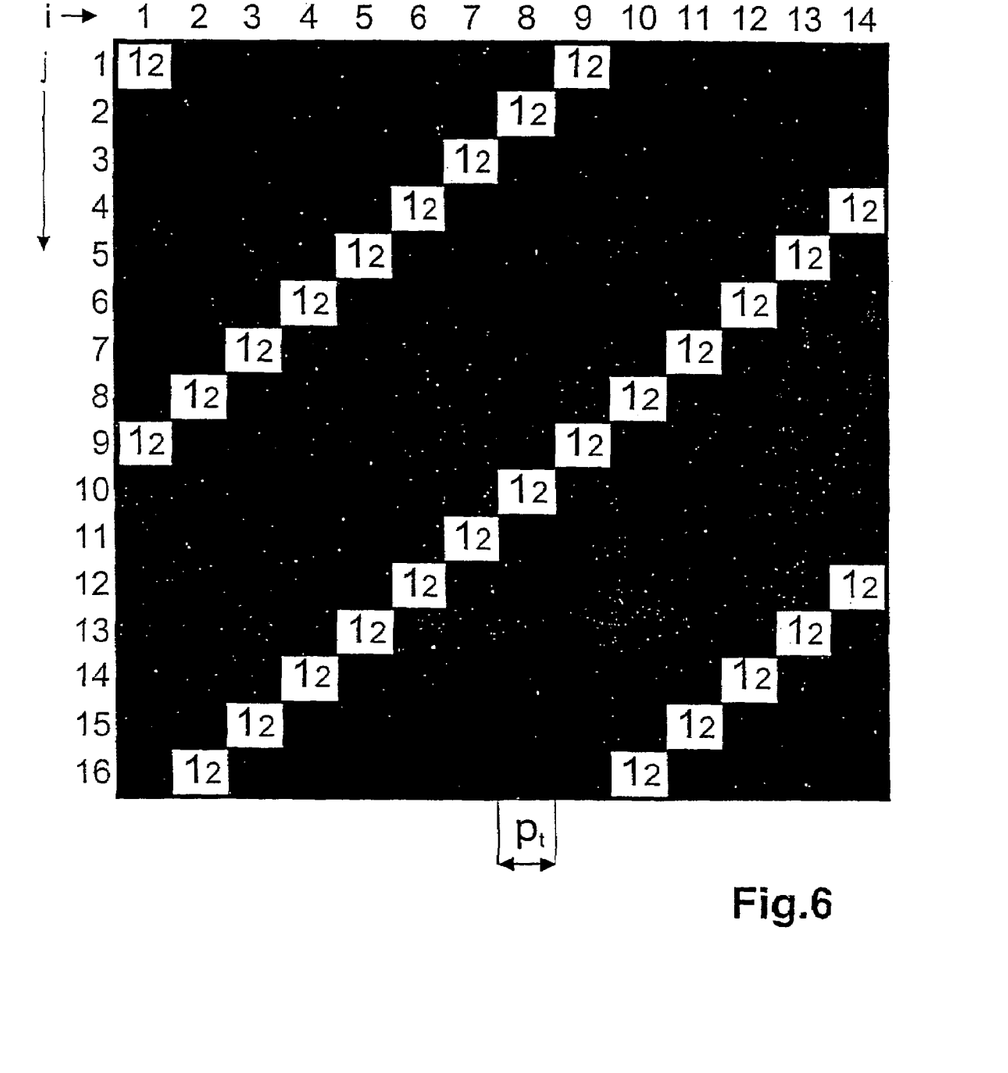
FIG. 6 shows what is seen by one eye in a first position.
Figure 7:
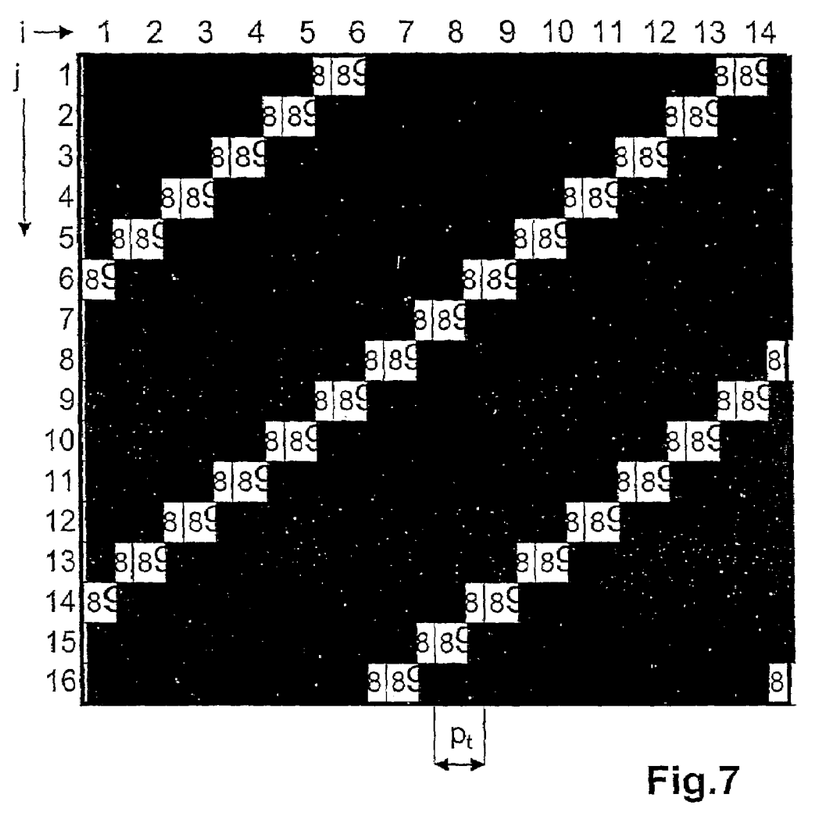
FIG. 7 shows what is seen by one eye in a second position.

FIG. 6 and FIG. 7 show, by way of example, what each of the two eyes of an observer can perceive under these conditions. The views weighted at $1/d_f$ are marked by large figures, and those weighted at $0.5/d_f$ by small ones. As the two eyes predominantly see a mean of different views, the impression is three-dimensional.

Figure 8:
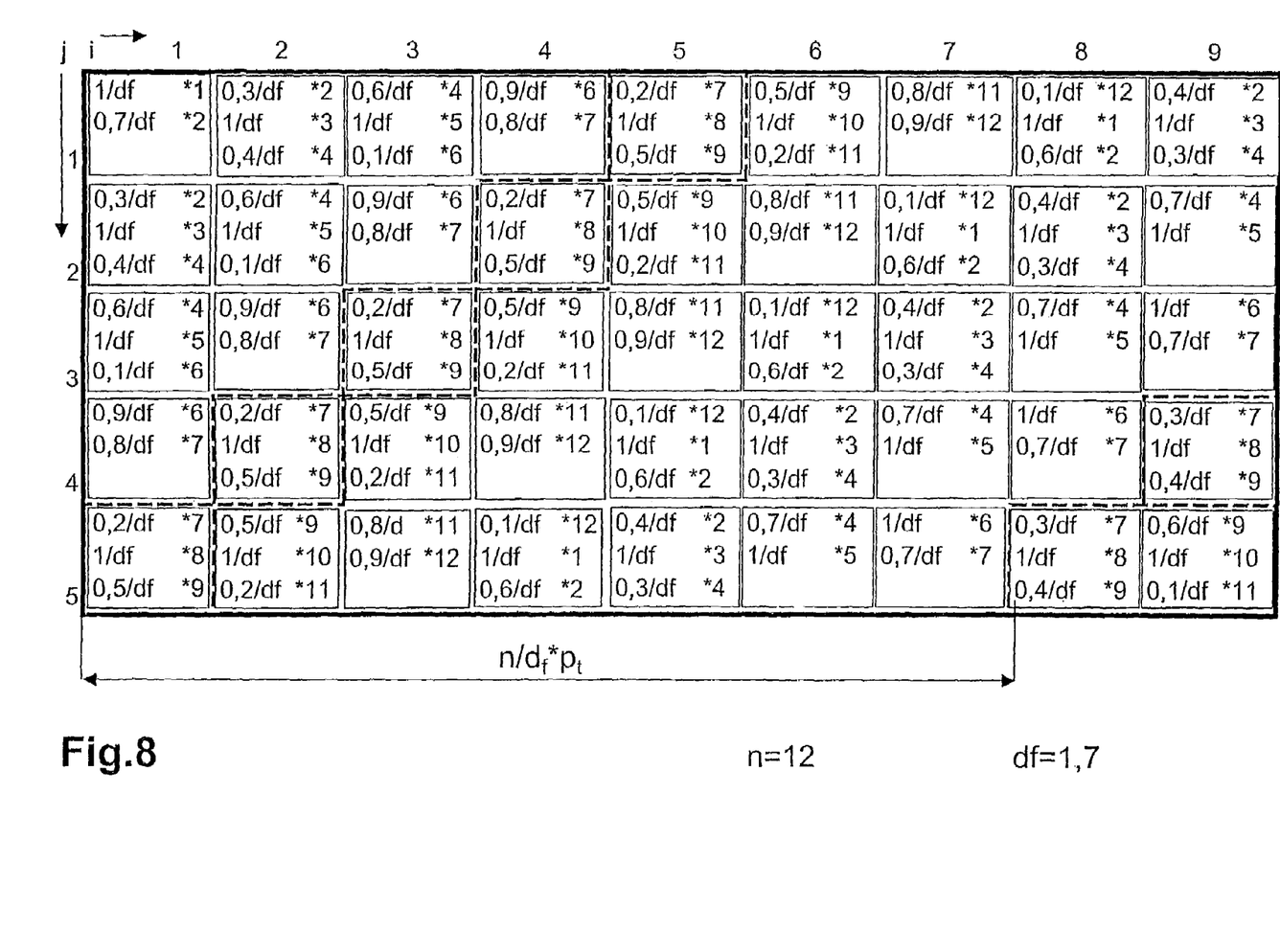
FIG. 8 shows the weighted allocation of the individual views to the image rendering elements on a matrix of RGB subpixels for n=12 views, with a density factor of $d_f=1.7$.

It should explicitly be noted here again that a density factor of 1.5 is only meant as a lucid example, because in practical application it is favorable to use such density factors rather that divide the total number of views n into a non-integer result. This follows, for example, from FIG. 8, which shows, for n=12 views, a weighted allocation of the various views to the image rendering elements on a matrix of RGB subpixels with a density factor of $d_f=1.7$. The dotted boxes mark the positions of the wavelength filters, and at distances of $n/d_f\rho_t$ each there is a transparent filter of the width $\rho_t$, whereas the remaining areas are opaque. While the first transparent filters at the left end of a row are positioned directly above the image rendering elements, those arranged further to the right are slightly shifted towards the right, due to the selection of the density factor. This increases the freedom of movement of an observer compared to the configuration described above, as each view remains visible within a larger angular range. Moreover, transitions between views appear less abrupt.

What is claimed is:

1. A method of spatial visualization of a scene or an object on the basis of several views ($A_c$) of the scene or object, in which the views ($A_c$) are decomposed, on matrices ($R_c$) with columns (k) and rows (l), into many bits of partial information ($a_{ckl}$) characterized by their wavelengths, with c=1, . . . ,n, where (n) designates the total number of views, the bits of partial information ($a_{ckl}$) are displayed in optically visible form by image rendering elements ($\alpha_{ij}$) arranged in a matrix of columns (i) and rows (j), making neighboring image rendering elements ($\alpha_{ij}$) emit light of different wavelengths ($\lambda$) or of different wavelength ranges ($\Delta\lambda$), propagation directions for the emitted light are defined by an array of many individual wavelength filters ($\beta_{pq}$) arranged in columns (p) and rows (q), which are transparent to different wavelengths ($\lambda$) or different wavelength ranges ($\Delta\lambda$) and which are arranged in front of or behind the matrix of image rendering elements ($\alpha_{ij}$), so that every one image rendering element ($\alpha_{ij}$) corresponds with several allocated wavelength filters ($\beta_{pq}$) or every one wavelength filter ($\beta_{pq}$) corresponds with several allocated image rendering elements ($\alpha_{ij}$) in such a way that each straight line connecting the centroid of the cross-section area of a visible segment of the image rendering element ($\alpha_{ij}$) and the centroid of the cross-section area of a visible segment of the wavelength filter ($\beta_{pq}$) corresponds to a propagation direction, so that an observer from every viewing position will see predominantly bits of partial information from a first selection of views ($A_c$) with one eye, and predominantly bits of partial information from a second selection of views ($A_c$) with the other eye, wherein at least one image rendering element ($\alpha_{ij}$) is allocated bits of partial information ($a_{ckl}$) from at least two different views ($A_c$) simultaneously, this allocation being made in such a way that the wavelength of the partial information ($a_{ckl}$) always equals the wavelength ($\lambda$), or lies in the wavelength range ($\Delta\lambda$), of the light emitted by the allocated image rendering element ($\alpha_{ij}$).

2. The method as set forth in claim 1, in which the bits of partial information ($a_{ckl}$) are allocated to the image rendering elements ($\alpha_{ij}$) according to the rule $$\alpha_{ij} = \sum_c \sum_k \sum_l a_{ck1} \cdot g_{cklij}$$

where (g) is a fifth-order tensor, the elements ($g_{cklij}$) of which are real numbers and act as weighting factors that determine the weight of the respective partial information ($a_{ckl}$) in an image rendering element ($\alpha_{ij}$).

3. The method as set forth in claim 1, in which the index k is equaled to i and the index l is equaled to j, the bits of partial information ($a_{ckl}$) are allocated to the image rendering elements ($\alpha_{ij}$) according to the rule $$\alpha_{ij} = \sum_c a_{cij} g_{cij}(d_f)$$

by which procedure each image rendering element ($\alpha_{ij}$) is allocated bits of partial information ($a_{cij}$) from identical positions (i, j) only in the matrices ($R_c$) of the views ($A_c$), and in which ($d_f$) is a density factor, which can adopt real numbers as values and which states the number of views from which bits of partial information ($a_{cij}$) are, on average, allocated to one image rendering element ($\alpha_{ij}$), with the weighted sum of the bits of partial information ($a_{cij}$) allocated to each image rendering element ($\alpha_{ij}$) being normalized at 1.

4. The method as set forth in claim 3, in which the weighting factors ($g_{cij}$) are established by the rule $$d_f \cdot g_{cij} = \delta((Rnd[(i+j-1) \cdot d_f] - 1) \bmod n + 1 - c) \cdot [$$
$$Frac((i+j-1) \cdot d_f) \cdot \delta(\delta(Frac[(i+j-1) \cdot d_f])) +$$
$$\delta(Frac[(i+j-1) \cdot d_f])] +$$
$$\delta((Rnd[(i+j-2) \cdot d_f] - 1 + \delta(Frac[(i+j-2) \cdot d_f])) \bmod n + 1 - c) \cdot [1 -$$
$$Frac[(i+j-2) \cdot d_f]] +$$

-continued $$\sum_{t=Rnd[(i+j-2) \cdot d_f] + \delta(Frac[(i+j-2) \cdot d_f]) + 1}^{Rnd[(i+j-1) \cdot d_f] - 1} \delta([t-1] \bmod n + 1 - c)$$

in which the density factor ($d_f$) is equal for all image rendering elements ($\alpha_{ij}$) and adopts a value greater than 1, $\delta(x)$ is a function that satisfies the conditions $\delta(x=0)=1$ and $\delta(x \neq 0)=0$, Rnd(x) is a function that, for arguments $x \geq 0$, supplies the next higher integer as a function value if the part of the arguments (x) after the decimal point is not equal to zero, and otherwise supplies the argument (x) itself, "mod" designates the residual class relative to a divisor, Frac(x) is a function that, for arguments $x \geq 0$, supplies the part of the argument (x) after the decimal point as a function value, and (t) is an integer, and the sum is assigned the value "zero" if the upper summation limit is smaller than the lower summation limit.

5. The method as set forth in claim 1 in which the density factor ($d_f$) is established according to the rule $$d_f = f$$

and (f) is a positive real number determined according to the rule $$f = \frac{d_a}{z + d_a}$$

in which (z) is the distance between the matrix of image rendering elements ($\alpha_{ij}$) and the array of wavelength filters ($\beta_{pq}$), and ($d_a$) is a selectable viewing distance, which essentially corresponds to the mean of all distances, possible throughout the viewing space, between the matrix of image rendering elements ($\alpha_{ij}$) and an observer or a viewing position.

6. The method as set forth in claim 3, in which the weighting factors are established according to the rule $$g_{cij} \sum_{t=Rnd\left(\frac{d_f(i,j)-1}{2}\right)}^{Rnd\left(\frac{d_f(i,j)-1}{2}\right)} \delta\left(\left[i+j+t-1+Int\left(\frac{n}{2}\right)\right] \bmod n + 1 - c\right) \cdot$$

$$\left\{ \frac{1}{d_f(i,j)} \delta\left[Rnd\left(\frac{d_f(i,j)-1}{2}\right) - t\right] \cdot Frac\left(\frac{d_f(i,j)-1}{2}\right) + \right.$$

$$\frac{1}{d_f(i,j)} \delta\left[Rnd\left(\frac{d_f(i,j)-1}{2}\right) + t\right] \cdot Frac\left(\frac{d_f(i,j)-1}{2}\right) +$$

$$\left. \frac{1}{d_f(i,j)} \delta\left(\delta\left[Rnd\left(\frac{d_f(i,j)-1}{2}\right) - t\right] + \delta\left[Rnd\left(\frac{d_f(i,j)-1}{2}\right) + t\right]\right) \right\}$$

in which the density factor ($d_f$) depends on the position (i, j) in the matrix of the image rendering elements ($\alpha_{ij}$).

7. The method as set forth in claim 6, in which the density factor ($d_f$) is described by the function $$d_f = \frac{e^{\left[-(i+j-Int\left[\frac{i+j}{n}\right]-n\frac{n+1}{2})^2\right]}}{c_{peak}} + d_f^{offset}$$

in which
  $c_{peak}$ is a selectable, real and positive parameter,
  $d_f^{offset}$ is a selectable, real and positive parameter, which causes a shift of the function values towards higher values, and
  the function Int(x), supplies, as a function value, the greatest integer that does not exceed the argument (x).

8. A Method of spatial visualization of a scene or an object on the basis of several views ($A_c$) of the scene or object, comprising the steps of
  decomposing the views ($A_c$), on matrices ($R_c$) with columns (k) and rows (l), into many bits of partial information ($a_{ckl}$) characterized by their wavelengths, with c=1, . . . ,n, where (n) designates the total number of views,
  displaying the bits of partial information ($a_{ckl}$) in optically visible form by image rendering elements ($\alpha_{ij}$) arranged in a matrix of columns (i) and rows (j), such that neighboring image rendering elements ($\alpha_{ij}$) emit light of different wavelengths ($\lambda$) or of different wavelength ranges ($\Delta\lambda$),
  defining propagation directions for the emitted light by lenticulars,
wherein
  at least one image rendering element ($\alpha_{ij}$) is allocated bits of partial information ($a_{ckl}$) from at least two different views ($A_c$) simultaneously,
  this allocation being made in such a way that the wavelength of the partial information ($a_{ckl}$) always equals the wavelength ($\lambda$), or lies in the wavelength range ($\Delta\lambda$), of the light emitted by the allocated image rendering element ($\alpha_{ij}$).

9. The method of spatial visualization of a scene or an object on the basis of several monochrome views ($A_c$) of the scene or object, comprising the steps of
  decomposing the views ($A_c$) on matrices ($R_c$) with columns (k) and rows (l), into many bits of partial information ($a_{ckl}$), with c=1, . . . ,n, where (n) designates the total number of views,
  displaying the bits of partial information ($a_{ckl}$) in optically visible form by image rendering elements ($\alpha_{ij}$) arranged in a matrix of columns (i) and rows (j),
  making all image rendering elements ($\alpha_{ij}$) emit light of the same wavelengths ($\lambda$) or of the same wavelength ranges ($\Delta\lambda$),
  defining propagation directions for the emitted light by one or several arrays of many individual wavelength filters ($\beta_{pq}$) arranged in columns (p) and rows (q), which are transparent to different wavelengths ($\lambda$) or different wavelength ranges ($\Delta\lambda$) and which are arranged in front of or behind the matrix of image rendering elements ($\alpha_{ij}$), so that every one image rendering element ($\alpha_{ij}$) corresponds with several allocated wavelength filters ($\beta_{pq}$) or every one wavelength filter ($\beta_{pq}$) corresponds with several allocated image rendering elements ($\alpha_{ij}$) in such a way that each straight line connecting the centroid of the cross-section area of a visible segment of the image rendering element ($\alpha_{ij}$) and the centroid of the cross-section area of a visible segment of the wavelength filter ($\beta_{pq}$) corresponds to a propagation direction, so that an observer from every viewing position will see predominantly bits of partial information from a first selection of views ($A_c$) with one eye, and predominantly bits of partial information from a second selection of views ($A_c$) with the other eye, wherein
  at least one image rendering element ($\alpha_{ij}$) is allocated bits of partial information ($a_{ckl}$) from at least two different views ($A_c$) simultaneously.

10. The method as set forth in claim 4, wherein the density factor ($d_f$) is equal for all image rendering elements ($\alpha_{ij}$) and adopts a value between 1.3 and 2.0.

11. The method as set forth in claim 8, in which
  the index k is equaled to i and the index l is equaled to j,
  the bits of partial information ($a_{ckl}$) are allocated to the image rendering elements ($\alpha_{ij}$) according to the rule $$\alpha_{ij} = \sum_c a_{cij} g_{cij}(d_f)$$

and in which
  the weighting factors are established according to the rule $$g_{cij} = \frac{1}{d_{fx} \cdot d_{fy}} \cdot \delta_{inv}(Frac(e_{xa})) \cdot (Rnd(e_{xa}) - e_{xa}) \cdot$$

$$\delta_{inv}(Frac(e_{ya})) \cdot (Rnd(e_{ya}) - e_{ya}) \cdot \delta(c - EZ(Int(e_{xa}), Int(e_{ya}))) +$$

$$\frac{1}{d_{fx} \cdot d_{fy}} \delta_{inv}(Frac(e_{xa})) \cdot (Rnd(e_{xa}) - e_{xa}) \cdot \delta_{inv}(Frac(e_{ye})) \cdot$$

$$(Frac(e_{ye})) \cdot \delta(c - EZ(Int(e_{xa}), Int(e_{ye}))) +$$

$$\frac{1}{d_{fx} \cdot d_{fy}} \delta_{inv}(Frac(e_{xe})) \cdot Frac(e_{xe}) \cdot \delta_{inv}(Frac(e_{ye})) \cdot$$

$$(Frac(e_{ye})) \cdot \delta(c - EZ(Int(e_{xe}), Int(r_{ye}))) +$$

$$\frac{1}{d_{fx} \cdot d_{fy}} \delta_{inv}(Frac(e_{xe})) \cdot Frac(e_{xe}) \cdot \delta_{inv}(Frac(e_{ya})) \cdot (Rnd(e_{ya}) - e_{ya}) \cdot$$

$$\delta(c - EZ(Int(e_{xe}), Int(e_{ya}))) + \sum_{q_k=Rnd(e_{ya})}^{Int(e_{ye})-1} \frac{1}{d_{fx} \cdot d_{fy}}$$

$$\delta_{inv}(Frac(e_{xa})) \cdot (Rnd(e_{xa}) - e_{xa}) \cdot \delta(c - EZ(Int(e_{xa}), Int(q_k))) +$$

$$\sum_{p_k=Rnd(e_{xa})}^{Int(e_{xe})-1} \frac{1}{d_{fx} \cdot d_{fy}} \cdot \delta_{inv}(Frac(e_{ye})) \cdot Frac(e_{ye}) \cdot$$

$$\delta(c - EZ(Int(p_k), Int(e_{ye}))) + \sum_{q_k=Rnd(e_{ya})}^{Int(e_{ye})-1} \frac{1}{d_{fx} \cdot d_{fy}} \cdot \delta_{inv}$$

$$(Frac(e_{xe})) \cdot Frac(e_{xe}) \cdot \delta(c - EZ(Int(e_{xe}), Int(q_k))) +$$

$$\sum_{p_k=Rnd(e_{xa})}^{Int(e_{xe})-1} \frac{1}{d_{fx} \cdot d_{fy}} \cdot \delta_{inv}(Frac(e_{ya})) \cdot Frac \cdot (Rnd(e_{ya}) - e_{ya}) \cdot$$

$$\delta(c - EZ(Int(p_k), Int(e_{ya}))) +$$

$$\sum_{q_k=Rnd(e_{ya})}^{Int(e_{ye})-1} \sum_{p_k=Rnd(e_{xa})}^{Int(e_{xe})-1} \frac{1}{d_{fx} \cdot d_{fy}} \cdot \delta(c - EZ(Int(p_k), Int(q_k)))$$

where $e_{xa}$, $e_{xe}$, $e_{ya}$ and $e_{ye}$ are auxiliary variables that apply to the relations $e_{xa} = i \cdot d_{fx} + \text{offset}_{ex}$ $e_{xe} = (i+1) \cdot d_{fx} + \text{offset}_{ex}$ $e_{ya} = j \cdot d_{fy} + \text{offset}_{ey}$ $e_{ye} = (j+1) \cdot d_{fy} + \text{offset}_{ey}$ and, a sum is assigned the value of zero if the upper summation limit is smaller than the lower summation limit.

12. The method as set forth in claim 9, in which
the index k is equaled to i and the index l is equaled to j,
the bits of partial information ($a_{ckl}$) are allocated to the image rendering elements ($\alpha_{ij}$) according to the rule $$\alpha_{ij} = \sum_c a_{cij} g_{cij}(d_f)$$

and in which
the weighting factors are established according to the rule $$g_{cij} = \frac{1}{d_{fx} \cdot d_{fy}} \cdot \delta_{inv}(Frac(e_{xa})) \cdot (Rnd(e_{xa}) - e_{xa}) \cdot$$

$$\delta_{inv}(Frac(e_{ya})) \cdot (Rnd(e_{ya}) - e_{ya}) \cdot \delta(c - EZ(Int(e_{xa}), Int(e_{ya}))) +$$

$$\frac{1}{d_{fx} \cdot d_{fy}} \delta_{inv}(Frac(e_{xa})) \cdot (Rnd(e_{xa}) - e_{xa}) \cdot \delta_{inv}(Frac(e_{ye})) \cdot$$

$$(Frac(e_{ye})) \cdot \delta(c - EZ(Int(e_{xa}), Int(e_{ye}))) +$$

$$\frac{1}{d_{fx} \cdot d_{fy}} \delta_{inv}(Frac(e_{xe})) \cdot Frac(e_{xe}) \cdot \delta_{inv}(Frac(e_{ye})) \cdot (Rnd(e_{ya}))$$

$$(Rnd(e_{ya}) - e_{ya}) \cdot \delta(c - EZ(Int(e_{xe}), Int(e_{ye}))) +$$

$$\frac{1}{d_{fx} \cdot d_{fy}} \delta_{inv}(Frac(e_{xe})) \cdot Frac(e_{xe}) \cdot \delta_{inv}(Frac(e_{ya})) \cdot (Rnd(e_{ya}) - e_{ya}) \cdot$$

$$\delta(c - EZ(Int(e_{xe}), Int(e_{ya}))) + \sum_{q_k=Rnd(e_{ya})}^{Int(e_{ye})-1} \frac{1}{d_{fx} \cdot d_{fy}}$$

-continued $$\delta_{inv}(Frac(e_{xa})) \cdot (Rnd(e_{xa}) - e_{xa}) \cdot \delta(c - EZ(Int(e_{xa}), Int(q_k))) +$$

$$\sum_{p_k=Rnd(e_{xa})}^{Int(e_{xe})-1} \frac{1}{d_{fx} \cdot d_{fy}} \cdot \delta_{inv}(Frac(e_{ye})) \cdot Frac(e_{ye}) \cdot$$

$$\delta(c - EZ(Int(p_k), Int(e_{ye}))) + \sum_{q_k=Rnd(e_{ya})}^{Int(e_{ye})-1} \frac{1}{d_{fx} \cdot d_{fy}} \cdot \delta_{inv}$$

$$(Frac(e_{xe})) \cdot Frac(e_{xe}) \cdot \delta(c - EZ(Int(e_{xe}), Int(q_k))) +$$

$$\sum_{p_k=Rnd(e_{xa})}^{Int(e_{xe})-1} \frac{1}{d_{fx} \cdot d_{fy}} \cdot \delta_{inv}(Frac(e_{ya})) \cdot Frac \cdot (Rnd(e_{ya}) - e_{ya}) \cdot$$

$$\delta(c - EZ(Int(p_k), Int(e_{ya}))) +$$

$$\sum_{q_k=Rnd(e_{ya})}^{Int(e_{ye})-1} \sum_{p_k=Rnd(e_{xa})}^{Int(e_{xe})-1} \frac{1}{d_{fx} \cdot d_{fy}} \cdot \delta(c - EZ(Int(p_k), Int(q_k)))$$

wherein $e_{xa}$, $e_{xe}$, $e_{ya}$ and $e_{ye}$ are auxiliary variables that apply to the relations $e_{xa} = i \cdot d_{fx} + \text{offset}_{ex}$ $e_{xe} = (i+1) \cdot d_{fx} + \text{offset}_{ex}$ $e_{ya} = j \cdot d_{fy} + \text{offset}_{ey}$ $e_{ye} = (j+1) \cdot d_{fy} + \text{offset}_{ey}$ and, a sum is assigned the value of zero if the upper summation limit is smaller than the lower summation limit.

* * * * *